(12) United States Patent
Roper et al.

(10) Patent No.: US 9,470,337 B2
(45) Date of Patent: Oct. 18, 2016

(54) FLOW PATH VELOCITY MODIFIER FOR A CONTROL VALVE

(71) Applicant: EMERSON PROCESS MANAGEMENT REGULATOR TECHNOLOGIES, INC., McKinney, TX (US)

(72) Inventors: Daniel G. Roper, Lucas, TX (US); Harold J. Mckinney, Durant, OK (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 14/679,113

(22) Filed: Apr. 6, 2015

(65) Prior Publication Data

US 2015/0285402 A1    Oct. 8, 2015

Related U.S. Application Data

(60) Provisional application No. 61/976,828, filed on Apr. 8, 2014.

(51) Int. Cl.
  F16K 1/36    (2006.01)
  F16K 47/04   (2006.01)
  F16K 3/26    (2006.01)
  F16K 1/46    (2006.01)

(52) U.S. Cl.
  CPC ............... *F16K 47/04* (2013.01); *F16K 1/36* (2013.01); *F16K 1/46* (2013.01); *F16K 3/26* (2013.01)

(58) Field of Classification Search
  CPC ............ F16K 47/04; F16K 1/46; F16K 1/36; F16K 3/26

USPC ................... 251/333, 121–122, 325
  See application file for complete search history.

(56) References Cited

U.S. PATENT DOCUMENTS

| | | | | |
|---|---|---|---|---|
| 1,962,520 | A | * | 6/1934 | O'Malley ............... F16K 1/422 251/333 |
| 2,158,737 | A | * | 5/1939 | Wunsch ................ F16K 5/0407 251/121 |
| 2,311,009 | A | | 2/1943 | Urquhart |
| 2,362,438 | A | * | 11/1944 | Marsh .................... F16K 41/12 251/271 |

(Continued)

FOREIGN PATENT DOCUMENTS

| EP | 0140510 A1 | 5/1985 |
|---|---|---|
| EP | 2188555 A2 | 5/2010 |

(Continued)

OTHER PUBLICATIONS

Search Report for International application No. PCT/US2015/024805, mailed Jul. 8, 2015.

(Continued)

*Primary Examiner* — John Bastianelli
(74) *Attorney, Agent, or Firm* — Marshall, Gerstein & Borun LLP

(57) ABSTRACT

A flow path velocity modifier allows a control member of a control valve to operate very close to a seat ring while reducing or eliminating restricted flow areas, which results in greatly reduced flow velocity fluctuations, which results in smoother flow, between the sealing element and the seat ring. As a result, sealing elements made of relatively soft materials may be used without fear of damage from high flow velocities.

12 Claims, 2 Drawing Sheets

(56) References Cited

U.S. PATENT DOCUMENTS

Figure 1:
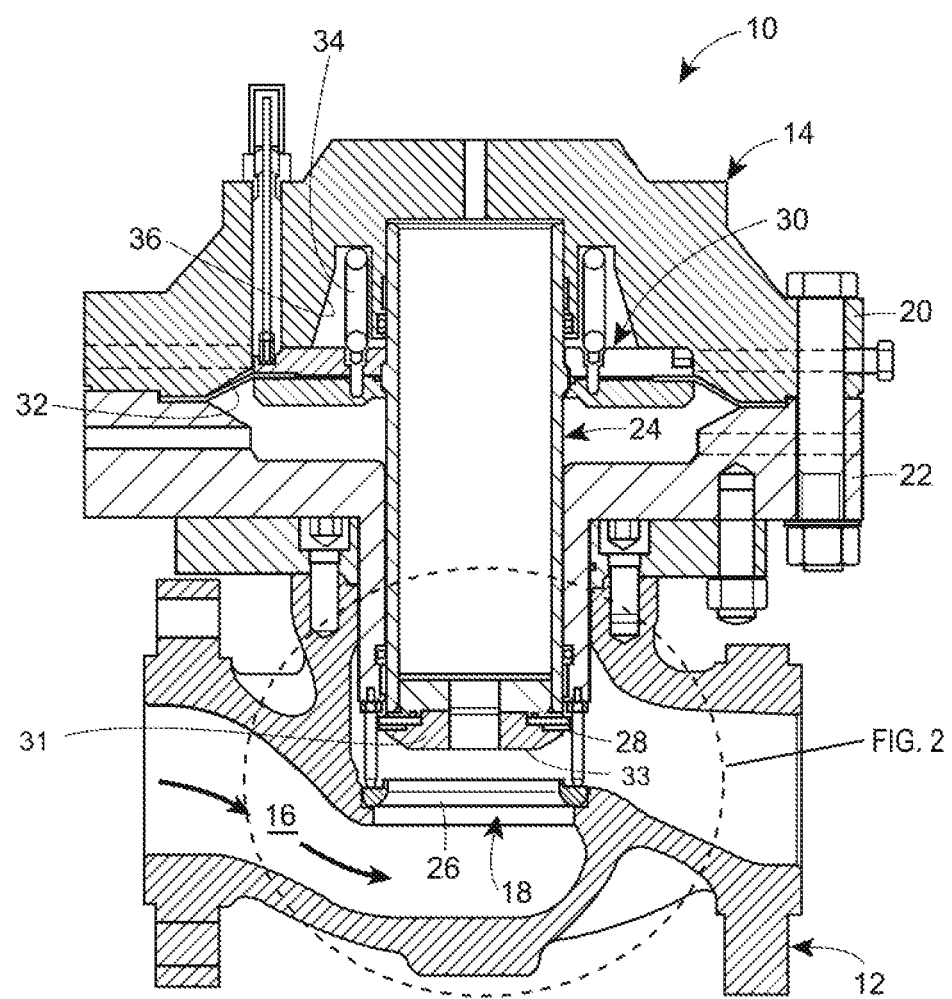
Figure 2:
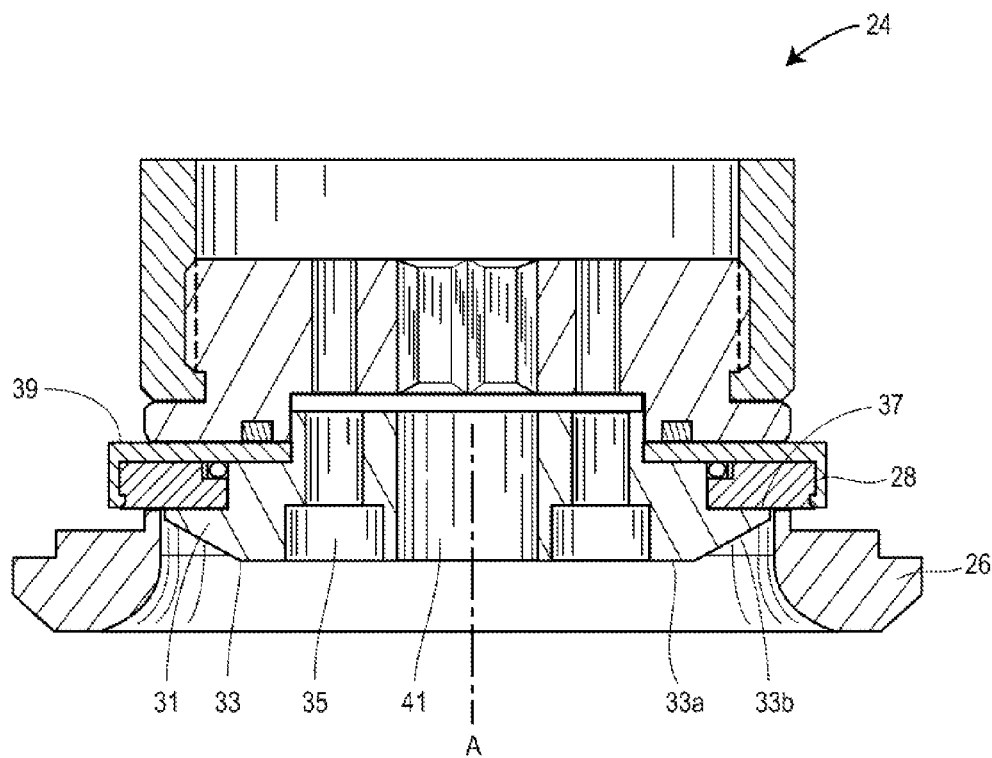
Figure 3:
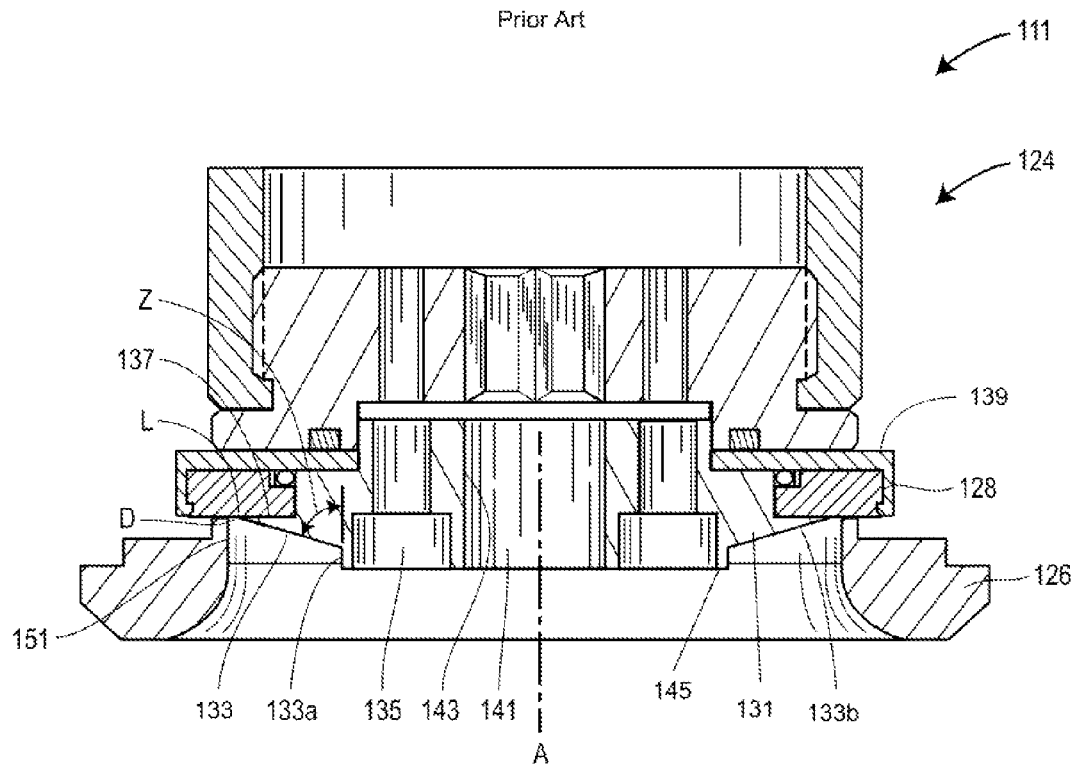

| | | | |
|---|---|---|---|
| 2,601,989 A * | 7/1952 | Modes | F16K 11/048 251/325 |
| 2,969,218 A | 1/1961 | Shaw | |
| 3,039,488 A | 6/1962 | Bowerman | |
| 3,057,372 A | 10/1962 | Sutton | |
| 3,409,039 A * | 11/1968 | Griffin | F16K 1/385 251/333 |
| 3,467,357 A * | 9/1969 | Weise | F16K 1/34 251/214 |
| 3,486,528 A | 12/1969 | Frees | |
| 4,671,490 A * | 6/1987 | Kolenc | F16K 41/12 251/357 |
| 5,052,435 A * | 10/1991 | Crudup | F16K 15/063 251/332 |
| 5,123,436 A * | 6/1992 | Koechlein | G05D 16/0666 251/332 |
| 6,811,140 B1 * | 11/2004 | Maini | F16K 43/008 251/214 |
| 6,935,616 B2 * | 8/2005 | Baumann | F16K 39/022 251/121 |
| 2010/0078084 A1 * | 4/2010 | Zuck | F16K 1/10 137/528 |

FOREIGN PATENT DOCUMENTS

| | | |
|---|---|---|
| GB | 985805 A | 3/1965 |
| GB | 2136540 A | 9/1984 |
| GB | 2222663 A | 3/1990 |

OTHER PUBLICATIONS

Written Opinion for International application No. PCT/US2015/024805, mailed Jul. 8, 2015.

\* cited by examiner

FLOW PATH VELOCITY MODIFIER FOR A CONTROL VALVE

FIELD OF DISCLOSURE

The present disclosure generally relates to a fluid control valve and, more particularly, to a flow path velocity modifier for a fluid control valve.

BACKGROUND

Fluid control devices include various categories of equipment including control valves and regulators. Such control devices are adapted to be coupled within a fluid process control system such as chemical treatment systems, natural gas delivery systems, etc., for controlling the flow of a fluid therethrough. Each control device defines a fluid flow-path and includes a control member for adjusting a dimension of the flow-path. For example, FIG. 1 depicts a known control valve regulator assembly 10 including a valve body 12 and an actuator 14. The valve body 12 defines a flow-path 16 and includes a throat 18. In FIG. 1, the regulator assembly 10 is configured in a flow-up configuration. The actuator 14 includes an upper actuator casing 20, a lower actuator casing 22, a diaphragm subassembly 30 including a diaphragm 32, and a control member 24.

The control member 24 is disposed within the upper and lower actuator casings 20, 22 and is adapted for bi-directional displacement in response to changes in pressure across the diaphragm subassembly 30. So configured, the control member 24 controls the flow of fluid through the throat 18. In some applications, a retainer 31 is secured to the bottom of the control member 24. The retainer 31 secures a sealing element 28 to the bottom of the control member 24. The retainer 31 includes a lower surface 33, distal to the control member 24 that has a generally convex shape, which extends outwardly beyond the sealing element 28, and past which the fluid flows when the regulator assembly 10 is in the open position. Additionally, the regulator assembly 10 includes a seat ring 26 disposed in the throat 18 of the valve body 12. When the outlet pressure of the valve body 12 is high, the sealing element 28 of the control member 24 may sealingly engage the seat ring 26 and close the throat 18. Similarly, absent any pressure in the actuator 14 or upon the failure of the diaphragm 32, a coil spring 34 disposed within an annular cavity portion 36 of the upper actuator casing 20 biases the control member 24 into the closed position. Such a regulator is commonly known as a "fail close" regulator. "Fail open" regulators operate similar to "fail closed" regulators; however, upon failure of the diaphragm, a spring biases the control member open, rather than closed.

Turning now to FIG. 2, the retainer 31 is illustrated in more detail. The retainer 31 is secured to the bottom of the control member 24 by a plurality of fasteners 35. The sealing element 28 is disposed between an upper surface 37 of the retainer 31 and a covering flange 39, which extends radially outward from the control member 24. The bottom surface 33 of the retainer 31 includes a first portion 33*a*, proximate a longitudinal axis A of the control member 24, the first portion 33*a* extending perpendicular to the longitudinal axis A of the control member 24 for a distance and a second portion 33*b* that angles radially upward, towards the sealing element 28. Generally speaking, the second portion 33*b* is angled about 30 degrees with respect to the longitudinal axis A. A balance cavity 41 may extend through the retainer 31 in some cases where a balanced valve is desired. When a balance cavity 41 extends through the retainer, the first portion 33*a* may extend outwardly from an edge of the balance cavity 41. The balance cavity 41 is a cylindrical opening having a longitudinal axis that is coincident with the longitudinal axis A of the control member 24. In other words, the retainer 31 has a longitudinal axis that is coincident with the longitudinal axis A.

Generally, valve sizing for a particular operation is determined such that the control member 24 will normally operate in the middle 80% of control member 24 travel for a majority of the operational time. By operating in the middle 80%, flow between the seat ring 26 and the sealing element 28 is predictable and smooth. However, in some cases, where a properly sized valve is not available, a valve that is larger than optimum may be used. In this case, the control member 24 and thus the sealing element 28 may operate a majority of the time relatively close to the seat ring 26, for example, within the closest 20% of the control member 24 travel to the seat ring 26, which can cause relatively high fluctuating flow velocities between the sealing element 28 and the seat ring 26 due to the formation of restricted flow areas. These high flow velocities can damage the relatively soft sealing element 28, which affects the shutoff capability of the control member 24.

SUMMARY

A flow path velocity modifier allows a control member of a control valve to operate very close to a seat ring while reducing or eliminating restricted flow areas, which results in greatly reduced fluctuating flow velocities between the sealing element and the seat ring. As a result, sealing elements made of relatively soft materials may be used without fear of damage.

BRIEF DESCRIPTION OF THE DRAWINGS

FIG. 1 is a cross-sectional side view of one conventional control valve;

FIG. 2 is a cross-sectional side view of a portion of a control member and valve seat of the convention control valve of FIG. 1; and FIG. 3 is a cross-sectional side view of a portion of a control member and valve seat including a flow path velocity modifier constructed in accordance with the teachings of the disclosure.

DETAILED DESCRIPTION

Turning now to FIG. 3, a sealing element assembly 111 that is constructed in accordance with the teachings of the disclosure is illustrated. The sealing element assembly 111 may be inserted into a known control valve, such as the control valve 10 of FIG. 1. When the sealing assembly 111 is inserted into a known control valve, an oversized valve may be used for a particular operation without creating detrimental restricted flow areas and higher fluctuating flow velocities that can damage the sealing element 128.

A retainer 131 having a body portion is secured to the bottom of a control member 124 by a plurality of fasteners 135. In some embodiments, other methods of securing the retainer 131 to the control member 124 may be used, such as, for example, interference fits, welds, adhesives, or other securing elements. The sealing element 128 is disposed between an upper surface 137 of the retainer 131 and a covering flange 139, which extends radially outward from the control member 124. The bottom surface 133 of the retainer 131 includes a first portion 133*a*, proximate a longitudinal axis A of the control member 124, the first portion 133a extending parallel to the longitudinal axis A of the control member 124 for a distance and a second portion 133b that angles radially upward, towards the sealing element 128 from the first portion 133a. Generally speaking, the second portion 133b is angled greater than 60 degrees with respect to the longitudinal axis A. In other words, an angle Z that is formed between the longitudinal axis A and the bottom surface of the second portion is greater than 60 degrees, preferably greater than 60 degrees but less than 90 degrees, and more preferably between 70 degrees and 80 degrees. Angles in these ranges optimize smoothing of the velocity fluctuations, and thus reduce damage to the sealing element 128.

A balance cavity 141 may extend through the retainer 131 in some cases where a balanced valve is desired. When a balance cavity 141 extends through the retainer, the first portion 133a may extend parallel to an edge 143 of the balance cavity 141, the first portion 133a forming a plug extension 145 that extends longitudinally outward, away from the control member 124. In some embodiments the plug extension may be substantially cylindrical in shape. The balance cavity 141 is a cylindrical opening having a longitudinal axis that is coincident with the longitudinal axis A of the control member 124. In other words, the retainer 131 has a longitudinal axis that is coincident with the longitudinal axis A.

The second surface 133b may extend away from the first surface 133a and towards the sealing element 128, meeting the sealing element 128 at a location L. When the control member 124 is in the closed position, a distance D may be formed between the location L and an inner surface 151 of the valve seat 126. In some embodiments, the distance D may be approximately 10% of the length of the second surface 133b. By leaving the distance D between the second surface 133b and the inner surface 151 of the valve seat 126, flow acceleration is reduced when the sealing element 128 is very close to the valve seat 126. As a result, flow velocities have reduced fluctuations (i.e., are smoothed) as the control member 124 moves towards the closed position, which reduces wear on the valve seat 126 and the sealing element 128.

In light of the foregoing, the description of the present disclosure should be understood as merely providing examples of the present invention and, thus, variations that do not depart from the gist of the invention are intended to be within the scope of the invention.

What is claimed:

1. A control member assembly for a control valve, the control member assembly comprising:
    a control member;
    a retainer secured to one end of the control member, the retainer having a body portion, the body portion having a longitudinal axis, a top surface, and a bottom surface, the bottom surface having a first portion that extends parallel to the longitudinal axis and a second portion that extends away from the first portion, the second portion being angled more than 60 degrees, but less than 90 degrees, with respect to the longitudinal axis, the second portion directly intersecting the first portion;
    a sealing element disposed between the top surface of the retainer and the control member; and
    a valve seat
    wherein the control member is longitudinally movable to bring the sealing element into contact with the valve seat in the closed position; and
    wherein the body portion includes a balance cavity extending therethrough.

2. The control member assembly of claim 1, wherein the second portion extends towards the sealing element, meeting the sealing element at a first location and when the control member is in a closed position, the second surface and an inner surface of the valve seat may be spaced from one another by a distance.

3. The control member assembly of claim 2, wherein the distance is 10% of the length of the second surface.

4. The retainer of claim 1, wherein the second portion is angled more than 70 degrees and less than 80 degrees with respect to the longitudinal axis.

5. The retainer of claim 1, wherein the first portion forms a plug extension that extends longitudinally outward, away from the body portion.

6. The retainer of claim 5, wherein the plug extension is cylindrical in shape.

7. A control valve comprising:
    a valve body having a flow path and a throat;
    a control member disposed within the valve body;
    a valve seat disposed within the valve body proximate the throat;
    a retainer attached to one end of the control member, the retainer having a body portion, the body portion having a longitudinal axis, a top surface, and a bottom surface, the bottom surface having a first portion that extends parallel to the longitudinal axis and a second portion that extends away from the first portion, the second portion being angled more than 60 degrees, but less than 90 degrees, with respect to the longitudinal axis, the second portion directly intersecting the first portion;
    a sealing element disposed between the top surface of the retainer and the control member,
    wherein the control member is longitudinally movable within the valve body to bring the sealing element into contact with the valve seat in a closed position, which prevents fluid flow through the throat; and
    wherein the body portion includes a balance cavity extending therethrough.

8. The control member assembly of claim 7, wherein the second portion extends towards the sealing element, meeting the sealing element at a first location and when the control member is in a closed position, the second portion may be spaced apart from an inner surface of the valve seat by a distance.

9. The control member assembly of claim 8, wherein the distance is 10% of the length of the second surface.

10. The retainer of claim 7, wherein the second portion is angled more than 70 degrees and less than 80 degrees with respect to the longitudinal axis.

11. The retainer of claim 7, wherein the first portion forms a plug extension that extends longitudinally outward, away from the body portion.

12. The retainer of claim 11, wherein the plug extension is cylindrical in shape.

* * * * *